United States Patent
Ghoneim et al.

(10) Patent No.: US 8,655,528 B2
(45) Date of Patent: Feb. 18, 2014

(54) REAL-TIME ALLOCATION OF ACTUATOR TORQUE IN A VEHICLE

(75) Inventors: Youssef A. Ghoneim, Rochester, MI (US); Shih-Ken Chen, Troy, MI (US); Valery Pylypchuk, West Bloomfield, MI (US); Nikolai K. Moshchuk, Grosse Point, MI (US); Bakhtiar Brian Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 416 days.

(21) Appl. No.: 13/017,117

(22) Filed: Jan. 31, 2011

(65) Prior Publication Data
US 2012/0197469 A1 Aug. 2, 2012

(51) Int. Cl.
*G06F 19/00* (2011.01)

(52) U.S. Cl.
USPC .................................. 701/22; 701/69; 701/70

(58) Field of Classification Search
USPC ............ 701/22, 36, 51, 69, 70, 73; 180/65.1, 180/65.221, 65.24, 65.265, 65.275, 65.6, 180/65.31
See application file for complete search history.

(56) References Cited

U.S. PATENT DOCUMENTS

| | | | |
|---|---|---|---|
| 5,358,317 A | 10/1994 | Cikanek | |
| 6,222,334 B1 | 4/2001 | Tamagawa et al. | |
| 6,318,487 B2 | 11/2001 | Yanase et al. | |
| 6,454,364 B1 | 9/2002 | Niwa et al. | |
| 6,488,344 B2 | 12/2002 | Huls et al. | |
| 8,190,344 B2 * | 5/2012 | Krueger et al. | 701/70 |
| 8,382,638 B2 * | 2/2013 | Erbguth et al. | 477/4 |
| 2004/0186647 A1 * | 9/2004 | Ono | 701/70 |

* cited by examiner

*Primary Examiner* — Richard Camby
(74) *Attorney, Agent, or Firm* — Quinn Law Group, PLLC

(57) ABSTRACT

A method for allocating forces among the corners of a vehicle having a redundant actuator suite includes determining a set of desired forces at the center of gravity of the vehicle, and allocating the set of desired forces among the corners of the vehicle as virtual control commands using a controller. The method also includes mapping the virtual control commands at the corners to actual or true control commands at the corners, and controlling a plurality of actuators at the corners using the actual or true control commands. The actuators may include friction brakes and wheel motors. Mapping the virtual control commands may include using a Least Squares formulation. Control of the actuators may be prioritized with respect to each other using weighting matrices. A vehicle includes a controller having actuators and a controller configured for executing the above method.

15 Claims, 1 Drawing Sheet

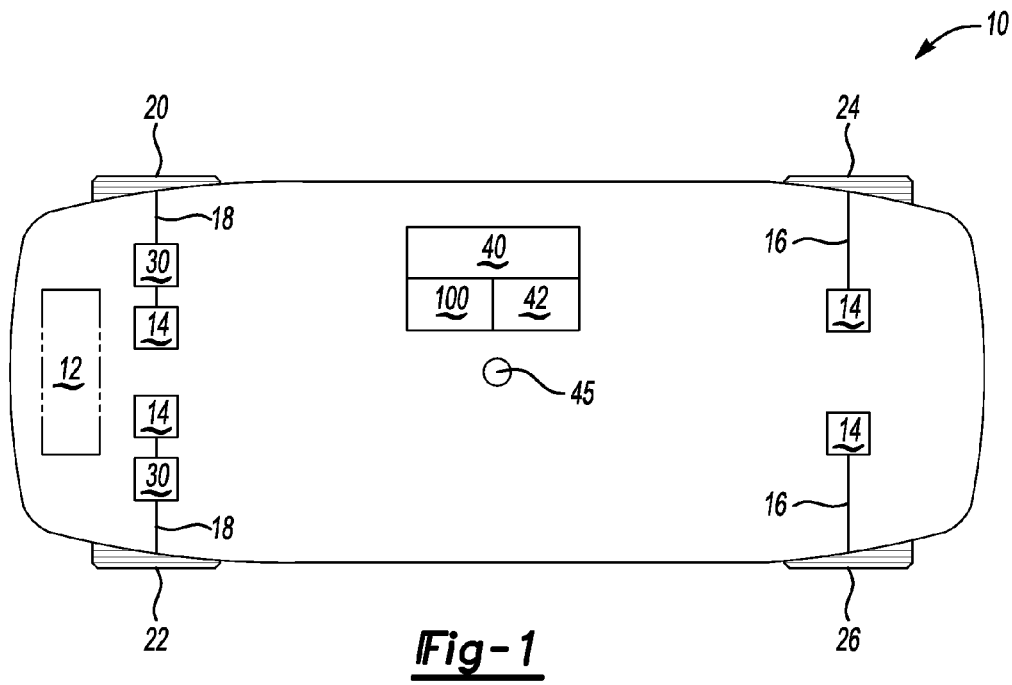
*Fig-1*
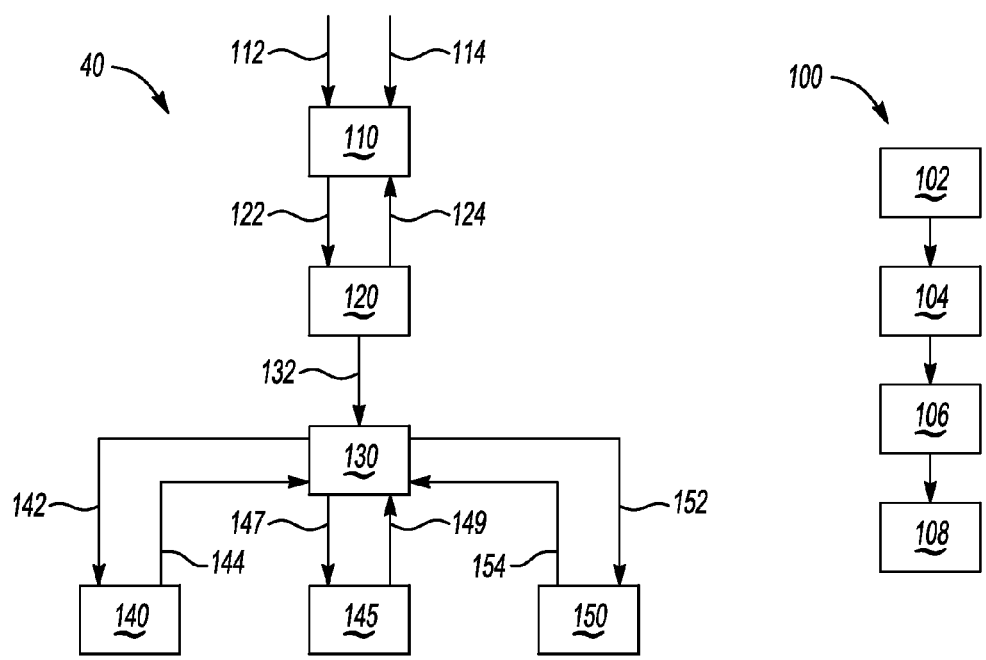
*Fig-2*
*Fig-3*

REAL-TIME ALLOCATION OF ACTUATOR TORQUE IN A VEHICLE

TECHNICAL FIELD

The present disclosure relates to allocating or distributing various motor, friction brake, or other actuator torques with respect to the corners of a hybrid electric or a battery electric vehicle.

BACKGROUND

Hybrid and battery electric powertrain controllers automatically manage the torque output of one or more prime movers, such as an internal combustion engine and/or one or more electric traction motors. Additional actuators such as friction brakes and wheel motors can act directly at each corner of the vehicle to provide a respective level of desired braking and propulsion force. Certain holistic control approaches can determine an optimal level of force to be applied at the various corners as a set of virtual control commands.

The effective transformation of the virtual control commands into a set of actual or true torque control commands is generally known as the control allocation problem. The control allocation problem may be particularly complex in the presence of a redundant actuator suite, i.e., when the number of actuators used at the corners or various wheel/road interfaces of a vehicle exceeds the number of forces to be controlled at the same corners. With a redundant actuator suite, there are several combinations of actuator positions which all produce the same virtual control, and hence provide the same overall system behavior.

SUMMARY

A method is disclosed herein for distributing or allocating, in real-time, an actual torque command among the corners of a vehicle having such a redundant actuator suite. As used herein, "corner" refers to a position of a wheel, so typically a vehicle has four corners, although this is not necessarily the case. The vehicle includes a number of corner actuators, e.g., friction brakes or electric wheel motors, exceeding the number of forces to be controlled at the corners. This control condition is also referred to as "over actuation".

The present method includes mapping, via a controller, virtual control commands to the physical/torque control at each corner, i.e., the true control commands. The actuators can be prioritized and controlled with respect to energy efficiency and/or bandwidth weighting matrices as set forth herein, thus customizing the performance for a particular powertrain design/actuator mix.

In particular, a method for allocating forces among the corners of a vehicle having a redundant actuator suite includes determining a set of desired forces at the center of gravity of the vehicle, and allocating the set of desired forces among the corners of the vehicle as virtual control commands using a controller. The method further includes mapping the virtual control commands at the corners to actual or true control commands at the same corners, and controlling a plurality of actuators at the corners using the actual or true control commands.

A controller for a vehicle having a redundant actuator suite includes a computing device and tangible/non-transitory memory. The computing device is configured, via execution of the process instructions, for executing the above method.

A vehicle having a redundant actuator suite includes a plurality of drive wheels each positioned at a different corner of the vehicle, a plurality of actuators each positioned with respect to at least one of the drive wheels, including a friction brake and a wheel motor, and the controller configured as noted above.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration of a vehicle having a redundant actuator suite and a controller configured for allocating actual torque commands at the corners of the vehicle;

FIG. 2 is a schematic flow diagram describing one possible embodiment of the controller shown in FIG. 1; and FIG. 3 is a flow chart describing a method for allocating actual torque commands at the corners of a vehicle.

DESCRIPTION

Referring to the drawings, a vehicle 10 having a center of gravity (point 45) is schematically represented in FIG. 1. The vehicle 10 may be configured as a hybrid electric vehicle (HEV) or a battery electric vehicle (BEV) according to two possible embodiments. If configured as an HEV, the vehicle 10 may include an internal combustion engine 12 as shown in phantom. The vehicle 10 includes one or more electric motors 14, one or more rear axles 16, one or more front axles 18, and wheels 20, 22, 24, and 26, i.e., one at each corner of the vehicle 10. Other vehicle embodiments may have a different number of corners, e.g., a three-wheeled vehicle design having three corners.

The vehicle 10 may also include a transmission (not shown) in some embodiments having one or more clutches, gear sets, etc., suitable for establishing a desired speed ratio or torque ratio. The particular vehicular embodiment shown in FIG. 1 positions a different motor 14 at each corner to be used as wheel motors, although the motors 14 may be alternatively configured as a single motor generator unit whose motor torque output is distributed to at least some of the wheels 20, 22, 24, and 26, as is well understood in the art.

When using multiple motors 14 configured as shown, each of the motors 14 can individually provide motor torque to a corresponding one of the wheels 20, 22, 24, and 26. At each of the wheels 20 and 22 in the embodiment shown in FIG. 1, friction brakes 30 are positioned and configured for applying a braking torque to the associated drive wheel 20 or 22. Additional friction brakes may also be positioned on the rear axles 16 at the drive wheels 24 and 26, a configuration which would increase the number of controlled actuators by two.

Still referring to FIG. 1, the vehicle 10 includes a controller 40 which allocates a set of virtual control commands (v) to the corners of the vehicle 10, and then maps a set of true/actual torque control commands (u) from the virtual control commands (v) as noted below. The controller 40 may be configured as digital computer or other computing device having a microprocessor or central processing unit, read only memory (ROM), random access memory (RAM), electrically-erasable programmable read only memory (EEPROM), a high-speed clock, analog-to-digital (A/D) and digital-to-analog (D/A) circuitry, and input/output circuitry and devices (I/O), as well as appropriate signal conditioning and buffer circuitry. Any algorithms resident in or accessible by the controller 40, including any process instructions or code required for executing the present method 100 as described below with reference to FIG. 3, can be recorded on tangible/non-transitory memory 42 and executed as needed by associated hardware components of the controller 40.

Memory 42 may be any medium that participates in providing computer-readable data or process instructions. Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Memory 42 may also include a floppy disk, a flexible disk, hard disk, magnetic tape, any other magnetic medium, a CD-ROM, DVD, any other optical medium, etc.

Various actuators may be used to modify the operation of different vehicle systems for the purpose of optimizing vehicle control. The friction brakes 30, the motors 14, and potentially other actuators enable precise force control aboard the vehicle 10 using inputs from a driver, and/or from a semiautonomous or autonomous system. For illustrative purposes, the friction brakes 30 and the motors 14 are described below as representative actuators, the control of which is determined and allocated according to the present method 100. However, other actuators may be envisioned and controlled within the scope of the present method 100.

Referring to FIG. 2, the logic flow of the controller 40 of FIG. 1 is shown according to one possible embodiment. As noted above, the controller 40 is configured for coordinating torque control at the corners of a vehicle having a redundant actuator suite, such as aboard the example vehicle 10 shown in FIG. 1. The controller 40 may include a command integration module 110 which monitors various manual driving inputs 112 and/or sensor-guided autonomous driving inputs 114. The command integration module 110 may generate desired vehicle dynamics/kinematics 122 and transmit the same to a vehicle dynamics module 120. The vehicle dynamics module 120 generates a desired vehicle force and moment 132 in response to the desired vehicle dynamics/kinematics 122, e.g., describing forces and a moment acting upon the center of gravity (point 45 of the vehicle 10 shown in FIG. 1), and resultant vehicle dynamics/kinematics 124.

In the exemplary embodiment of FIG. 2, the command integration module 110 additionally monitors the resultant vehicle dynamics/kinematics 124, and can utilize the resultant vehicle dynamics/kinematics 124 to provide feedback to the desired vehicle dynamics/kinematics 122. An actuator supervisory control module 130 may input the desired vehicle force and moment 132 and generate a set of control commands 142, 147, and 152 to respective actuator modules 140, 145, and 150, e.g., braking control modules and/or motor control processors for the respective brakes 30 and motors 14 shown in FIG. 1. Feedback signals 144, 149, and 154 are provided from the respective actuator modules 140, 145, and 150 back to the actuator supervisory control module 130 to enable closed-loop feedback control of the various actuators.

As noted above, the controller 40 is configured to determine a set of desired forces at the center of gravity (point 45 of FIG. 1) of the vehicle 10, and to allocate the desired forces among the corners of the vehicle 10 as virtual control commands (v), e.g., a desired corner force and moment. The controller 40 may monitor the manual driving inputs 112 and/or the sensor-guided autonomous driving inputs 114, and generate the desired vehicle dynamics/kinematics 122 describing the vehicle operation that is desired by a driver of the vehicle 10. For instance, the desired vehicle dynamics/kinematics 122 may be desired vehicle longitudinal, lateral forces, and a yaw moment.

According to one embodiment, the command integration module 110 of the controller 40 may utilize an inverse vehicle dynamics model. Additionally, the command integration module 110 may monitor the resultant vehicle dynamics/kinematics 124 as described above. The resultant vehicle dynamics/kinematics 124 may be developed via sensors or measurement systems of the type known in the art, for example by monitoring a yaw rate, lateral acceleration, longitudinal acceleration, wheel speeds, estimated tire slip, vehicle mass, tire radius, estimated forces, and/or estimated friction between the wheels and the road surface.

Using a dynamics model or any other suitable means, the controller 40 allocates the forces at the center of gravity (point 45 of FIG. 1) among the corners of the vehicle 10. Once allocated, the controller 40 maps the forces at the corners to ultimately determine control torques for the various actuators, and then coordinates torque control at each corner of the vehicle 10. This process will be explained in detail with reference to FIG. 3.

Referring to FIG. 3, the present method 100 can be executed by the controller 40 of FIG. 1 to transform a set of virtual control commands (v) at the corners of the vehicle 10 into a set of true/actual control commands (u). Beginning with step 102, the controller 40 first determines the corner forces at each of the corners, i.e., $F_{X1}, F_{X2}, F_{X3},$ and $F_{X4}$ in the four-corner example of the vehicle 10 shown in FIG. 1. In other words, at step 102 the controller 40 considers the following formulation:

$$\begin{bmatrix} F_X \\ F_Y \\ G_Z \end{bmatrix} = A_F^{3 \times 4} \begin{bmatrix} F_{X1} \\ F_{X2} \\ F_{X3} \\ F_{X4} \end{bmatrix}$$

where $F_X$ and $F_Y$ are the forces acting in the respective longitudinal and lateral directions at the center of gravity (point 45) of the vehicle 10 shown in FIG. 1, and $G_Z$ is the yaw moment at the center of gravity (point 45). $A_F$ is a matrix of the four corner forces ($F_{X1}, \ldots, F_{X4}$). Step 102 may entail using sensors and/or a suitable dynamics model as noted above, or any other suitable means, potentially including assuming approximately equal forces at the corners during a state of linear travel at a steady speed. The method 100 proceeds to step 104 when the desired forces have been allocated among the corners.

At step 104, the controller 40 formulates a torque-to-force relationship for the above distributed force set. One possible formulation is the relationship v=Bu, where B is a matrix providing a transfer function that maps desired forces to actual torques. For example, using the vehicle 10 of FIG. 1 with its four motors 14 and two friction brakes 30:

$$v = \begin{bmatrix} F_{X1} \\ F_{X2} \\ F_{X3} \\ F_{X4} \end{bmatrix} = \begin{bmatrix} \frac{N_{fg}}{r_w} & 0 & 0 & 0 & \frac{1}{r_w} & 0 \\ 0 & \frac{N_{fg}}{r_w} & 0 & 0 & 0 & \frac{1}{r_w} \\ 0 & 0 & \frac{N_{fg}}{r_w} & 0 & 0 & 0 \\ 0 & 0 & 0 & \frac{N_{fg}}{r_w} & 0 & 0 \end{bmatrix} \begin{bmatrix} T_{m1} \\ T_{m2} \\ T_{m3} \\ T_{m4} \\ T_{f1} \\ T_{f2} \end{bmatrix}$$

where ($N_{fg}$) is the gear ratio of a front gear, ($r_w$) is the radius of the drive wheels 20, 22, 24, 26, $T_{m1}$-$T_{m4}$ are the true/actual control torques for each of the motors 14, and $T_{f1}$ and $T_{f2}$ are the control torques for each of the friction brakes 30. In other words, the true control commands (u) provide the desired output commands, and are operated on via a transfer function matrix (B). The method 100 then proceeds to step 106.

At step 106, the controller 40 continues to map the virtual control commands (v) to the true control commands (u). The following formulation may be applied by the controller 40:

$$\|W_u(u-u_{des})\|^2 + \gamma \|W_v(Bu-v)\|^2$$

where $W_u$ and $W_v$ are calibrated weighting matrices as described below. If there are several possible solutions, the controller 40 selects the optimal solution. If there is no solution, the controller 40 can determine the closest possible solution. That is, the controller 40 can use weighted Least Squares, wherein:

$$u = \arg\min \|W_u(u-u_{des})^2 + \gamma \|W_v(Bu-v)|^2$$

with $\gamma \gg 1$ being an integer selected to emphasize that primarily (Bu-v) should be minimized. In this formula, ($u_{des}$) is the desired control input, and ($W_u$) and ($W_v$) are weighting matrices. The matrix ($W_u$) allows for actuator prioritization, i.e., for selecting which of the actuators aboard the vehicle 10 of FIG. 1 should be primarily used. The matrix ($W_v$) allows for control prioritization when (Bu-v) has no solution. Thus:

$$\left\| \begin{bmatrix} \gamma^{\frac{1}{2}} W_v B \\ W_u \end{bmatrix} u - \begin{bmatrix} \gamma^{\frac{1}{2}} W_v v \\ W_u u_{des} \end{bmatrix} \right\|^2 = \|Au - b\|^2$$

In the example embodiment of the vehicle 10 shown in FIG. 1, there are six actuators, i.e., four of the motors 14 and two of the friction brakes 30. These actuators can be arbitrarily labeled as (1)-(6), with the matrices ($W_v$) and ($W_u$) denoted as follows:

$$W_v = \begin{bmatrix} W_v(1) & 0 & 0 & 0 \\ 0 & W_v(2) & 0 & 0 \\ 0 & 0 & W_v(3) & 0 \\ 0 & 0 & 0 & W_v(4) \end{bmatrix}$$

$$W_u = \begin{bmatrix} W_u(1) & 0 & 0 & 0 & 0 & 0 \\ 0 & W_u(2) & 0 & 0 & 0 & 0 \\ 0 & 0 & W_u(3) & 0 & 0 & 0 \\ 0 & 0 & 0 & W_u(4) & 0 & 0 \\ 0 & 0 & 0 & 0 & W_u(5) & 0 \\ 0 & 0 & 0 & 0 & 0 & W_u(6) \end{bmatrix}$$

From this formulation, the controller 40 can define the matrices A and B as follows:

$$A = \begin{bmatrix} \gamma^{\frac{1}{2}} \frac{N_{fg} W_v(1)}{r_w} & 0 & 0 & 0 & \gamma^{\frac{1}{2}} \frac{W_v(1)}{r_w} & 0 \\ 0 & \gamma^{\frac{1}{2}} \frac{N_{fg} W_v(2)}{r_w} & 0 & 0 & 0 & \gamma^{\frac{1}{2}} \frac{W_v(2)}{r_w} \\ 0 & 0 & \gamma^{\frac{1}{2}} \frac{N_{rg} W_v(3)}{r_w} & 0 & 0 & 0 \\ 0 & 0 & 0 & \gamma^{\frac{1}{2}} \frac{N_{rg} W_v(4)}{r_w} & 0 & 0 \\ W_u(1) & 0 & 0 & 0 & 0 & 0 \\ 0 & W_u(2) & 0 & 0 & 0 & 0 \\ 0 & 0 & W_u(3) & 0 & 0 & 0 \\ 0 & 0 & 0 & W_u(4) & 0 & 0 \\ 0 & 0 & 0 & 0 & W_u(5) & 0 \\ 0 & 0 & 0 & 0 & 0 & W_u(6) \end{bmatrix}$$

$$b = \begin{bmatrix} \gamma^{\frac{1}{2}} F_{X1} \\ \gamma^{\frac{1}{2}} F_{X2} \\ \gamma^{\frac{1}{2}} F_{X3} \\ \gamma^{\frac{1}{2}} F_{X4} \\ T_{dm1} W_u(1) \\ T_{dm2} W_u(2) \\ T_{dm3} W_u(3) \\ T_{dm4} W_u(4) \\ T_{df1} W_u(5) \\ T_{df2} W_u(6) \end{bmatrix}$$

In the above matrices, the set [$T_{dm1}$, $T_{dm2}$, $T_{dm3}$, $T_{dm4}$, $T_{df1}$, and $T_{df2}$] are the desired true control commands (u) for the motor torques (m1-m4) and the friction brake torques (f1, f2). To maximize the usage of regenerative braking, the controller 40 may set the desired friction torque $T_{df1}$ and $T_{df2}$ to zero, thus prioritizing the use of the motors 14 over the brakes 30. Other actuators likewise may be selectively limited to provide the desired powertrain operation, or to otherwise tune the performance of the various actuators.

The controller 40 can minimize the functions $$\|Au - b\|_2^2 = (Au - b)^T (Au - b) = (b^T - u^T A^T).$$

As will be recognized by those of ordinary skill in the art, this is a quadratic function of the true control commands (u), and hence has a global minimum. The controller 40 can therefore take the derivative and set it to zero, i.e.:

$$A^T A u - A^T b = 0$$

$$\hat{u} = \lfloor (A^T A)^{-1} A^T \rfloor b$$

The matrix inverse ($A^T A$) exists, thus leading to a closed-form solution.

At step 108, the controller 40 can then coordinate torque control at each corner using the true control commands (u), determined as set forth above. Adding additional actuators, e.g., two more brakes 30 at the rear axle(s) 16 of FIG. 1, will merely increase the size of the matrices used in the above formulations, e.g., a 4×8 matrix if eight actuators are used instead of the six example actuators shown in FIG. 1.

Therefore, using the controller 40 and method 100 explained above, a reusable optimal solution is provided for real-time optimal supervisory torque control and allocation aboard a vehicle. The method 100 is configurable for other HEV and BEV designs, as noted above, by modifying the matrices to fit the particular vehicle configuration and number/type of actuators used. For instance, if a battery can accept power from both front and rear motors, one may tune the controller 40 such that only regenerative braking is used, as noted above. In an alternative example, rear motors 14 can be used for braking, front motors accelerated to recharge the battery, and a friction brake used to offset the front motors and brake the front wheels. In this manner, development time and cost may be reduced.

While the best modes for carrying out the invention have been described in detail, those familiar with the art to which this invention relates will recognize various alternative designs and embodiments for practicing the invention within the scope of the appended claims.

The invention claimed is:

1. A method for allocating forces among the corners of a vehicle having a redundant actuator suite, the method comprising:
    determining a set of desired forces at the center of gravity of the vehicle, including monitoring, via a controller, a set of manual driving inputs and a set of sensor-guided autonomous driving inputs;
    allocating the set of desired forces among the corners of the vehicle as virtual control commands using the controller;
    mapping the virtual control commands at the corners to actual or true control commands at the corners; and
    controlling a plurality of actuators at the corners using the actual or true control commands.

2. The method of claim 1, wherein controlling a plurality of actuators includes controlling a plurality of friction brakes and a plurality of wheel motors.

3. The method of claim 1, wherein mapping the virtual control commands includes using a Least Squares formulation.

4. The method of claim 3, further comprising: prioritizing the control of the actuators with respect to each other using weighting matrices.

5. The method of claim 1, wherein determining a set of desired forces at the center of gravity of the vehicle includes using a vehicle dynamics model.

6. A controller for a vehicle having a redundant actuator suite, and operable for allocating forces among the corners of the vehicle, the controller comprising:
    a computing device; and
    tangible/non-transitory computer-readable memory on which is recorded process instructions for allocating the forces among the corners;
    wherein the computing device is configured, via execution of the process instructions, for:
        determining a set of desired forces at the center of gravity of the vehicle;
        allocating the set of desired forces among the corners of the vehicle as virtual control commands;
        mapping the virtual control commands at the corners to actual or true control commands at the corners using a Least Squares Formulation; and
        controlling a plurality of actuators at the corners using the actual or true control commands.

7. The controller of claim 6, wherein controlling a plurality of actuators includes controlling a plurality of friction brakes and a plurality of wheel motors.

8. The controller of claim 6, wherein the controller is configured for prioritizing the control of the actuators with respect to each other using weighting matrices.

9. The controller of claim 6, wherein the controller is configured for determining a set of desired forces at the center of gravity of the vehicle using a vehicle dynamics model.

10. The controller of claim 6, wherein the controller determines the set of desired forces at the center of gravity by monitoring a set of manual driving inputs and a set of sensor-guided autonomous driving inputs.

11. A vehicle having a redundant actuator suite, comprising:
    a plurality of drive wheels each positioned at a different corner of the vehicle;
    a plurality of actuators each positioned with respect to at least one of the drive wheels, including a friction brake and a wheel motor; and
    a controller configured for allocating forces among the corners of the vehicle;
    wherein the controller is configured for:
        determining a set of desired forces at the center of gravity of the vehicle, including monitoring a set of manual driving inputs and a set of sensor-guided autonomous driving inputs;
        allocating the set of desired forces among the corners of the vehicle as virtual control commands using a controller;
        mapping the virtual control commands at the corners to actual or true control commands at the corners; and
        controlling the plurality of actuators using the actual or true control commands.

12. The vehicle of claim 11, wherein the vehicle is configured as one of a hybrid electric vehicle and a battery electric vehicle.

13. The vehicle of claim 11, wherein the controller is configured for prioritizing the control of the actuators with respect to each other using weighting matrices.

14. The vehicle of claim 11, wherein the controller is configured for mapping the virtual control commands via a Least Squares formulation.

15. The vehicle of claim 11, wherein the controller is further configured for determining the set of desired forces at the center of gravity of the vehicle using a vehicle dynamics model.

\* \* \* \* \*